United States Patent [19]

Nishimori

[11] 4,378,776

[45] Apr. 5, 1983

[54] INTERNAL COMBUSTION ENGINE HAVING EXHAUST GAS RECIRCULATION SYSTEM

[75] Inventor: Takayoshi Nishimori, Hiroshima, Japan

[73] Assignee: Toyo Kogyo Co., Ltd., Hiroshima, Japan

[21] Appl. No.: 295,519

[22] Filed: Aug. 24, 1981

[30] Foreign Application Priority Data

Aug. 25, 1980 [JP] Japan .................................. 55-117462

[51] Int. Cl.³ ............................................. F02M 25/06
[52] U.S. Cl. ...................................... 123/571; 123/568
[58] Field of Search ................................. 123/571, 568

[56] References Cited

U.S. PATENT DOCUMENTS

| | | | |
|---|---|---|---|
| 3,915,134 | 10/1975 | Young et al. | 123/571 |
| 3,969,614 | 7/1976 | Moyer et al. | 123/571 X |
| 4,123,729 | 10/1978 | Buetemeister | 123/571 X |
| 4,164,032 | 8/1979 | Nohira et al. | 123/571 X |
| 4,170,973 | 10/1979 | Nohira et al. | 123/571 |
| 4,280,471 | 7/1981 | Masaki | 123/571 |
| 4,318,385 | 3/1982 | Yamaguchi | 123/571 |

FOREIGN PATENT DOCUMENTS 54-38437 3/1979 Japan.

*Primary Examiner*—Wendell E. Burns
*Attorney, Agent, or Firm*—Fleit, Jacobson & Cohn

[57] ABSTRACT

An internal combustion engine has an exhaust gas recirculation system including a recirculation valve for controlling the amount of exhaust gas returned to the intake system. The position or opening of the valve is controlled to a desired position in accordance with a memory in a memory device storing desired valve positions under various combinations of the engine load and the engine speed. A device is provided for closing the recirculation valve when the actual valve position does not conform with the desired position for a predetermined time.

5 Claims, 3 Drawing Figures

INTERNAL COMBUSTION ENGINE HAVING EXHAUST GAS RECIRCULATION SYSTEM

The present invention relates to exhaust gas recirculation means for internal combustion engines and more particularly to recirculation valve control means for such exhaust gas recirculation means.

Conventionally, internal combustion engines have exhaust gas recirculation means for returning a part of exhaust in the exhaust system to the intake system so that the concentration of nitrogen oxides can be decreased in the exhaust gas. For the purpose, the engine is provided with an exhaust gas recirculation passage having a recirculation valve for controlling the amount of exhaust gas. In view of the fact that the recirculation of the exhaust gas to the intake system has an adverse effect on the drivability and the fuel economy of the engine, it is desirable to control the amount of recirculation gas to the minimum desired value For the purpose, in Japanese patent application No. 52-103953 filed on Aug. 30, 1977 and disclosed on Mar. 23, 1979 for public inspection under the disclosure number of No. 54-38437, there is proposed to provide an electronical system for controlling the recirculation valve. According to the proposal, there is provided a memory device which stores the desired values of pressure for actuating the recirculation valve under various combinations of two parameters among the engine speed, the amount of intake air and the intake pressure. The system further includes control means which addresses the memorized value in accordance with the measured values of the two parameters of the engine operation and compare the addressed value with the measured value of the valve operating pressure to thereby control the valve operating pressure so that it conforms with the desired pressure under the operating condition.

It should however be noted that, in the exhaust gas recirculation system, there are possibilities of malfunctioning of the recirculation valve, the actuating mechanism therefor and the control means to thereby result in an excessive amount of recirculation. Where the recirculation of the exhaust gas is excessive, there will be a significantly adverse effect on the drivability of the engine and there will be problems of failure of engine start and a decrease in the engine output.

It is therefore an object of the present invention to provide exhaust gas recirculation means in which means is provided for preventing excessive recirculation of exhaust gas.

Another object of the present invention is to provide electronically controlled exhaust gas recirculation means in which means is provided for shutting down the recirculation when there is any malfunction in the control system.

According to the present invention, the above and other objects can be accomplished by an internal combustion engine comprising an exhaust system for passing exhaust gas from combustion chamber means, an intake system leading to said combustion chamber means to provide a supply of intake gas thereto, an exhaust gas recirculation system having exhaust gas recirculation passage means for returning a certain amount of exhaust gas to said intake system, recirculation valve means provided in said recirculation passage means, said recirculation valve means including valve member means of which position can be changed to vary the amount of exhaust gas which is to be returned to the intake system, engine load sensing means for detecting engine load and producing an engine load signal, engine speed sensing means for detecting engine speed and producing an engine speed signal, valve member position sensing means for detecting the position of the valve member means in the circulation valve means, memory means storing memories of desired positions of the valve member means under various combinations of values of the engine load and the engine speed, control means for controlling the circulation valve means in accordance with the load and engine speed signals so that the actual position of the valve member means conforms with the desired position under the detected engine load and speed, means for closing said circulation passage means, said control means including means for actuating said closing means when the actual position of the valve member means does not conform with the desired position within a predetermined time.

The means for closing the recirculation passage means may be embodied as means for actuating the recirculation valve means to the closed position. Alternatively, a separate shut-off valve may be provided in the recirculation passage means so that it is actuated to close the recirculation passage means when the actual position of the valve member means does not conform with the desired position within a predetermined time.

The above and other objects and features of the present invention will become apparent from the following descriptions of a preferred embodiment taking reference to the accompanying drawings, in which.

Figure 1:
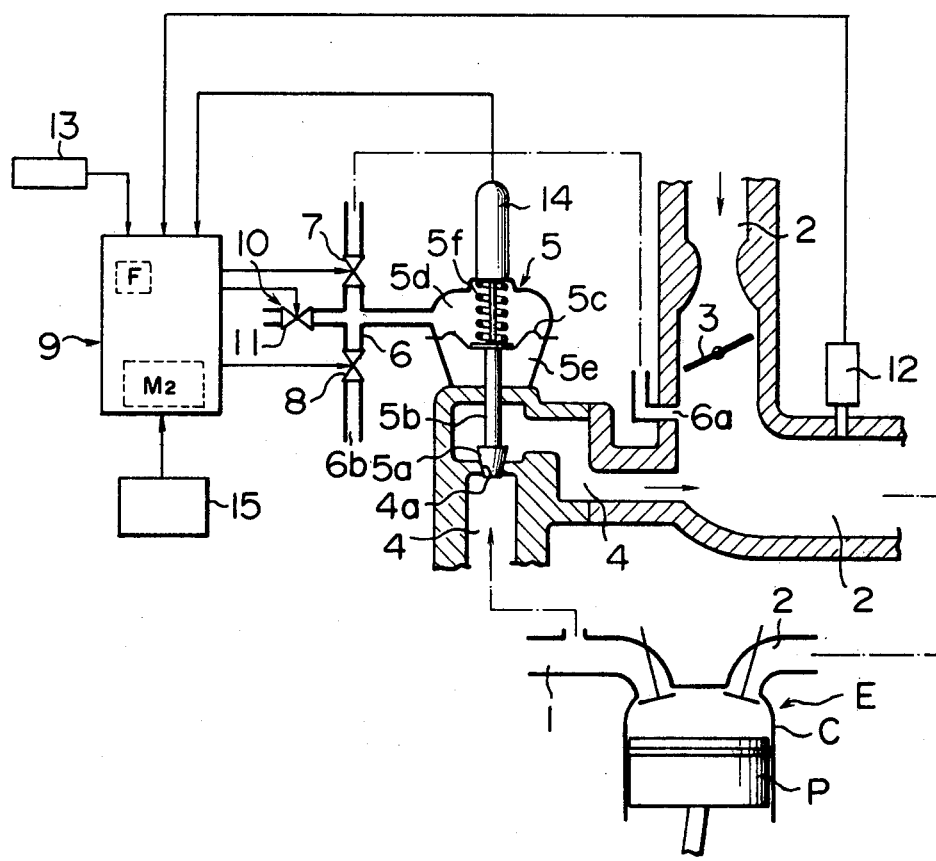
FIG. 1 is a diagrammatical illustration of an exhaust gas recirculation system for an internal combustion engine in accordance with one embodiment of the present invention.

Referring now to the drawings, particularly to FIG. 1 there is shown an engine E including a cylinder C and a piston P. The cylinder C is formed with an intake port P1 communicating with an intake passage 2 and an exhaust port P2 leading to an exhaust passage 1. In the intake passage 2, there is provided a throttle valve 3 for controlling the flow of intake air. An exhaust gas recirculation passage 4 is branched from the exhaust passage 1 and opened to the intake passage 2 downstream of the throttle valve 3. In the recirculation passage 4, there is provided a recirculation valve 5 which includes a valve member 5a for cooperating with a valve port 4a formed in the passage 4. The valve member 5a is integrally formed with a valve stem 5b which extends outwardly from the passage 4 and is connected with a diaphragm 5c of a valve actuator. The diaphragm 5c divides the inside of the valve actuator casing into a suction pressure chamber 5d and an atmospheric pressure chamber 5e. A spring 5f is provided in the suction pressure chamber 5d so as to force the diaphragm 5c and therefore the valve stem 5b into a position wherein the valve member 5a closes the valve port 4a. When the chamber 5d is applied with a suction pressure, the diaphragm 5c and the valve stem 5b is moved against the influence of the spring 5f to thereby open the valve port 4a.

The suction pressure chamber 5d is connected with a suction pressure passage 6 which opens at one end 6a to the intake passage 2 downstream of the throttle valve 3 and at the other end 6b to the atmosphere. In the suction pressure passage 6, there are disposed a suction pressure solenoid valve 7 and an atmospheric pressure solenoid valve 8 and the chamber 5d is connected with the passage between the valves 7 and 8. In order to control the valves 7 and 8, there is provided a control device 9 which produces control signals to appropriately actuate the valves 7 and 8 so that a desired pressure is maintained in the suction pressure chamber 5d.

The suction pressure passage 6 is further provided with a valve closing device 10 which includes a releasing solenoid valve 11 connected with the passage 6 between the valves 7 and 8. The valve 11 is adapted to be opened under the signal from the control device 9 so as to release the suction pressure in the chamber 5d to thereby close the valve port 4a by the valve member 5a.

In the intake passage 2, there is provided a load sensor 12 which detects the engine load in terms of an intake pressure downstream of the throttle valve 3. Alternatively, the load sensor may be a flowmeter for detecting the flow of the intake air. Further, the engine E is provided with a speed senser 13 which detects the engine speed. The recirculation valve 5 is provided with a valve member position senser 14 which detects the position of the valve stem 5b and therefore the valve member 5a. The signals from the sensors 12, 13 and 14 are applied to the control device 9.

Figure 2:
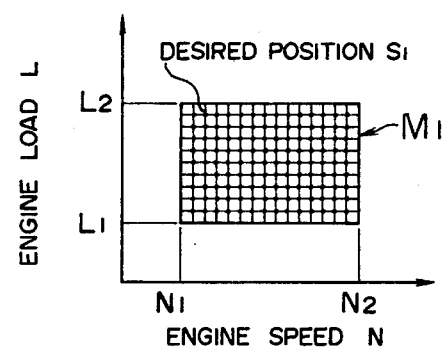
FIG. 2 is a diagrammatical illustration of a memorized map in the memory device; and, FIG. 3 is a flow chart showing the operation of the control device.

Further, the control device 9 is associated with a memory device 15 having a memory which may be in the form of a map $M_1$ as shown in FIG. 2 storing the informations on desired positions of the valve member 5a in the recirculation valve 5 under various combinations of the engine load and the engine speed. The desired positions of the valve member 5a may be determined through experiments. The control device 9 may be comprised of a known microprocessor and may include a flag F and a memory $M_2$ which may be used as a counter.

Figure 3:
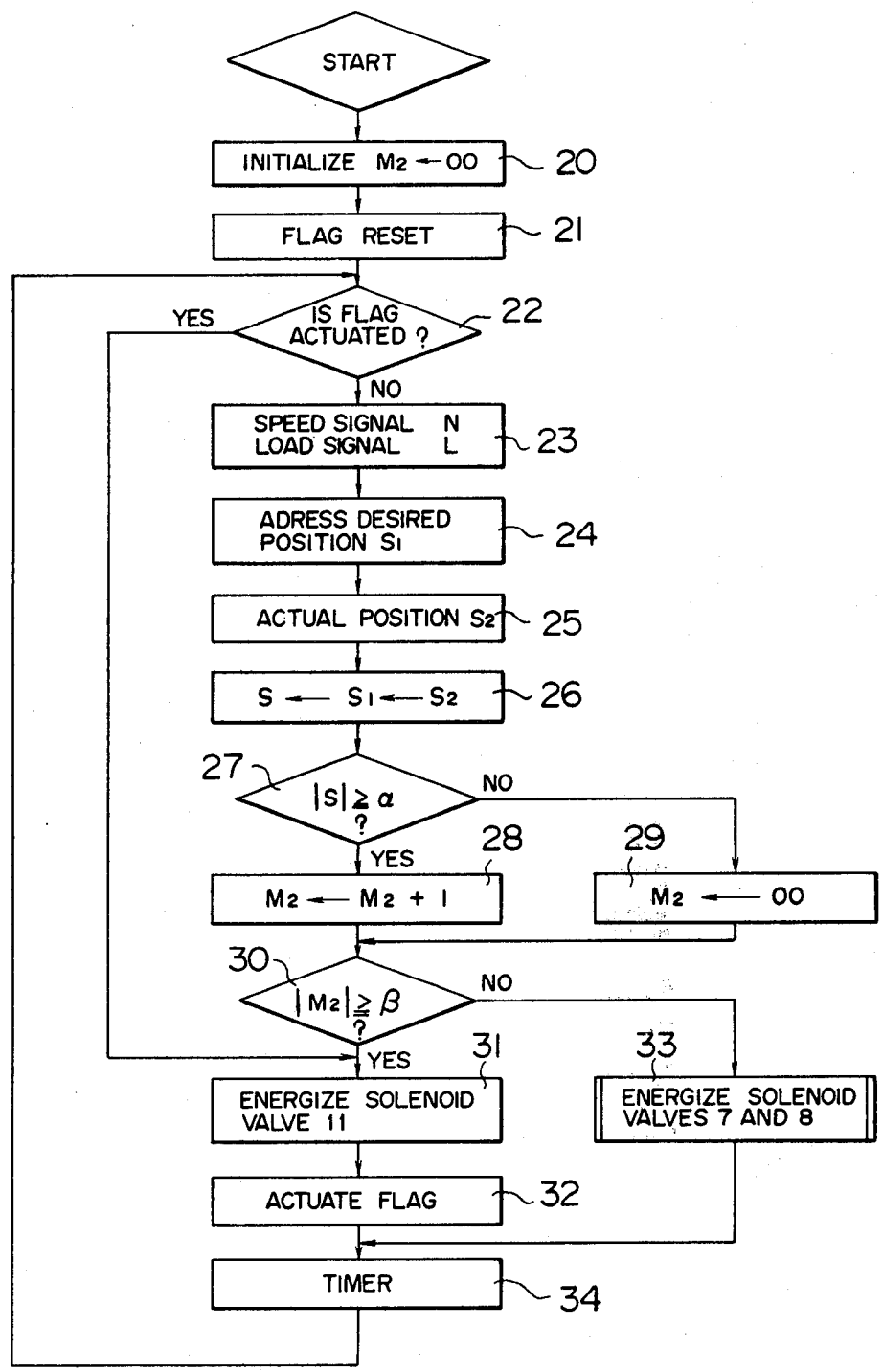

Referring now to FIG. 3, when the engine E is started, the memory $M_2$ in the control device 9 is cleared as shown in step 20 and the flag 1 is moved to a reset position as shown in step 21. The microprocessor then determines whether or not the flag F is actuated. As long as the flag F is not actuated or is in the reset position, the microprocessor addresses the stored memory in the map $M_1$ in accordance with the load and speed signals from the sensers 12 and 13 as shown in steps 23 and 24. Then, the addressed memory $S_1$ is compared as shown in steps 25 and 26 with the signal $S_2$ from the senser 14, the signal $S_2$ representing the position of the valve member 5a. The difference between the addressed valve $S_1$ and the signal $S_2$ from the senser 14 is then compared with a predetermined value $\alpha$ as shown by step 27 and if the difference is smaller than the value $\alpha$ it is judged that the valve member 5a is at a desired position and no correction is required. The memory or counter $M_2$ is cleared as shown in step 29.

Where the difference is equal to or larger than the valve $\alpha$, the counter $M_2$ is advanced by one step as shown in step 28. The counted value in the counter $M_2$ is then compared in step 30 with a predetermined value $\beta$ and, if the count in the counter $M_2$ is smaller than the value $\beta$, the control device 9 produces a signal for appropriately energizing the solenoide valve 7 or 8 as shown in step 30. Thus, the pressure in the chamber 5d is changed to move the valve member 5a toward the desired position. After a predetermined time which is determined by a timer as shown in step 34, the same procedures are repeated so that the difference between the values $S_1$ and $S_2$ becomes smaller than the value $\alpha$.

When the difference between the values $S_1$ and $S_2$ become smaller than the value $\alpha$, the counter $M_2$ is cleared as shown by the step 29.

If, for some reasons, the valve member 5a does not follow the addressed memory, the count in the counter $M_2$ is advanced step by step through repetition of the aforementioned procedures. The count in the counter $M_2$ is compared with the predetermined value $\beta$ in the step 30. When the count in the counter $M_2$ exceeds the value $\beta$, the control device 9 produces a signal to energize the solenoid valve 11 as shown in step 31 to thereby open the suction pressure chamber 5d to the atmosphere. Thus, the valve member 5a is forced under the influence of the spring 5f to the closed position and therefore the recirculation of the exhaust gas is blocked. The flag F is than actuated as shown in step 32. Thereafter, the actuation of the flag F is detected in the step 22 and the energization of the solenoid valve 11 is maintained. In transient condition of the engine operation such as in acceleration or deceleration, the valve member 5a will follow the addressed position with a certain delay so that there will be a difference between the actual and desired positions of the valve member 5a. Thus, the value $\beta$ should be determined taking the transient period into account.

The invention has thus been shown and described with reference to a specific embodiment, however, it should be noted that the invention is in no way limited to the details of the illustrated structures but changes and modifications may be made without departing from the scope of the appended claims. For example, although in the illustrated embodiment the recirculation valve itself is actuated into the closed position upon energization of the valve 11, an additional shut-off valve 4 may be provided separately in the recirculation passage 4.

I claim:

1. An internal combustion engine comprising an exhaust system for passing exhaust gas from combustion chamber means, an intake system leading to said combustion chamber means to provide a supply of intake gas thereto, an exhaust gas recirculation system having exhaust gas recirculation passage means for returning certain amount of exhaust gas to said intake system, recirculation valve means provided in said recirculation passage means, said recirculation valve means including valve member means of which position can be changed to vary the amount of exhaust gas which is to be returned to the intake system, engine load sensing means for detecting engine load and producing an engine load signal, engine speed sensing means for detecting engine speed and producing an engine speed signal, valve member position sensing means for detecting the position of the valve member means in the recirculation valve means, memory means storing memories of desired positions of the valve member means under various combinations of values of the engine load and the engine speed, control means for controlling the recirculation valve means in accordance with the load and engine speed signals so that the actual position of the valve member means conforms with the desired position under the detected engine load and speed, means for closing said recirculation passage means, said control means including means for actuating said closing means when the actual position of the valve member means does not conform with the desired position within a predetermined time.

2. An internal combustion engine in accordance with claim 1 in which said means for closing the circulation passage means is means for actuating the recirculation valve means to closed position.

3. An internal combustion engine in accordance with claim 1 in which said engine load sensing means is means for detecting intake suction pressure.

4. An internal combustion engine in accordance with claim 1 in which said recirculation valve means includes suction pressure responsive valve actuating means which normally biases said valve member means into closed position and actuates the valve member means into open position when it is applied with a suction pressure, means being provided for applying a suction pressure to said valve actuating means, said means for closing said recirculation passage means including means for applying to said valve actuating means an atmospheric pressure instead of the suction pressure.

5. An internal combustion engine in accordance with claim 4 in which said means for applying a suction pressure to the valve actuating means is conduit means for leading an intake suction pressure to said valve actuating means, said means for applying to said valve actuating means an atmospheric pressure is valve means for opening the conduit means to atmosphere.

* * * * *